United States Patent [19]

Beauregard

[11] 4,146,693
[45] Mar. 27, 1979

[54] PROCESS FOR PREPARATION OF CIS-1,4 POLY(ISOPRENE)

[75] Inventor: Robert E. Beauregard, Copley, Ohio

[73] Assignee: The B. F. Goodrich Company, Akron, Ohio

[21] Appl. No.: 856,570

[22] Filed: Dec. 2, 1977

[51] Int. Cl.$^2$ ............................ C08F 4/48; C08F 2/42; C08F 36/08

[52] U.S. Cl. ........................................ 526/65; 526/67; 526/68; 526/70; 526/77; 526/82; 526/87; 526/159; 526/173; 526/340.2

[58] Field of Search ....................... 526/65, 67, 68, 70, 526/77, 82, 87, 159, 173, 340.2

[56] References Cited

U.S. PATENT DOCUMENTS

| | | | |
|---|---|---|---|
| 2,935,540 | 5/1960 | Wolfe | 526/77 |
| 3,250,757 | 5/1966 | Smith et al. | 526/65 |
| 3,256,262 | 6/1966 | Irvin | 526/70 |
| 3,442,878 | 5/1969 | Gippin | 526/340.2 |
| 3,549,609 | 12/1970 | Norwood | 526/70 |
| 3,708,465 | 1/1973 | Dietrich et al. | 526/82 |
| 3,755,273 | 8/1973 | Uraneck et al. | 526/77 |
| 3,912,701 | 10/1975 | Dunn, Jr. | 526/68 |

Primary Examiner—Alan Holler
Attorney, Agent, or Firm—John H. Faro

[57] ABSTRACT

Improved continuous process for synthesis of cis-1,4 poly(isoprene). In the commercial process for synthesis of cis-1,4 poly(isoprene) only a portion of the monomer charged is polymerized. The polymer, thus obtained, is separated from the unreacted monomer which in turn is recycled with solvent back into the system for conversion to additional polymer. Fresh monomer must be added from a separate feed to this recycle stream in sufficient quantity to replace or "make-up" for that which was converted to polymer. In the improved process of this invention, this "make-up" isoprene monomer is dried and then is introduced into the process subsequent to the initiation of polymerization of the isoprene monomer already present within the system, but prior to deactivation of the polymerization catalyst. Dehydration of "make-up" isoprene prior to its introduction into the process stream at the above juncture avoids deactivation of the still active catalyst with water. The still active catalyst is thus free to react with other impurities, thereby either removing them from the "make-up" isoprene, or substantially reducing their concentration. This improved process permits the use of a "make-up" isoprene feed having substantially higher levels of impurities (e.g. α-acetylenes and cyclopentadiene) than could previously be tolerated by the coordination catalyst. Thus, this process permits substantial savings with respect to both catalyst consumption and greatly simplifies purification procedures in preparation of the isoprene feed stock by eliminating the need to add materials for neutralization of these catalyst deactivating impurities.

7 Claims, 5 Drawing Figures

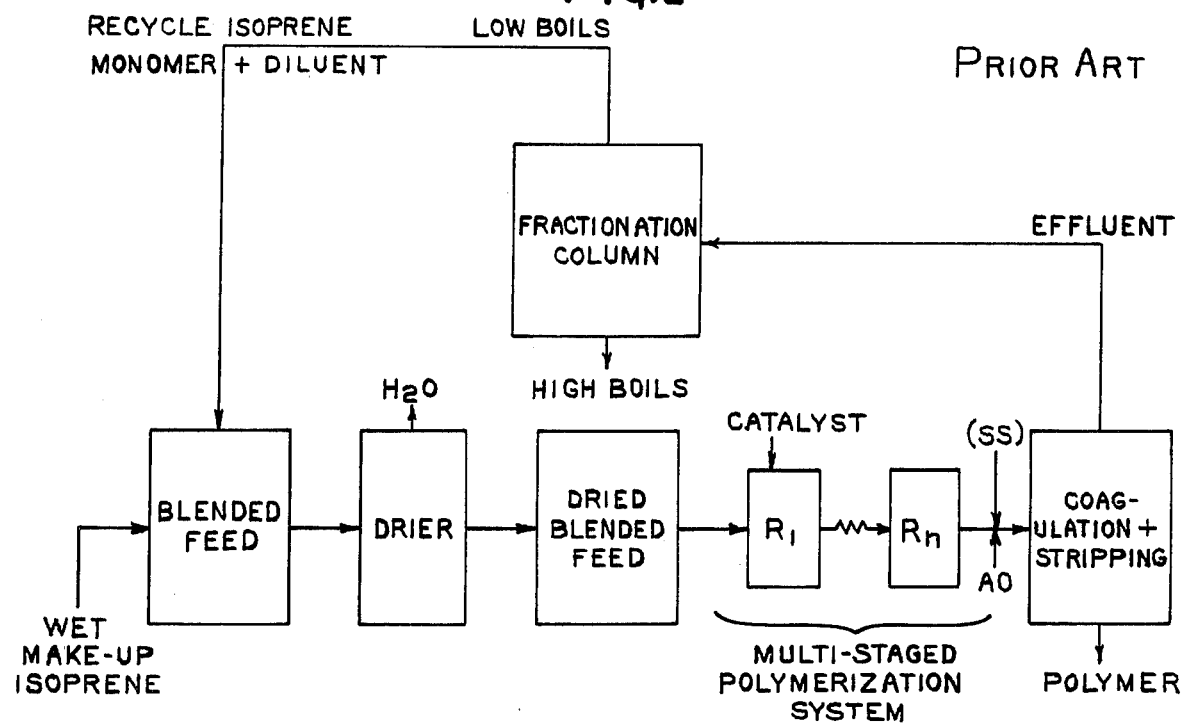
Fig.1 — Prior Art
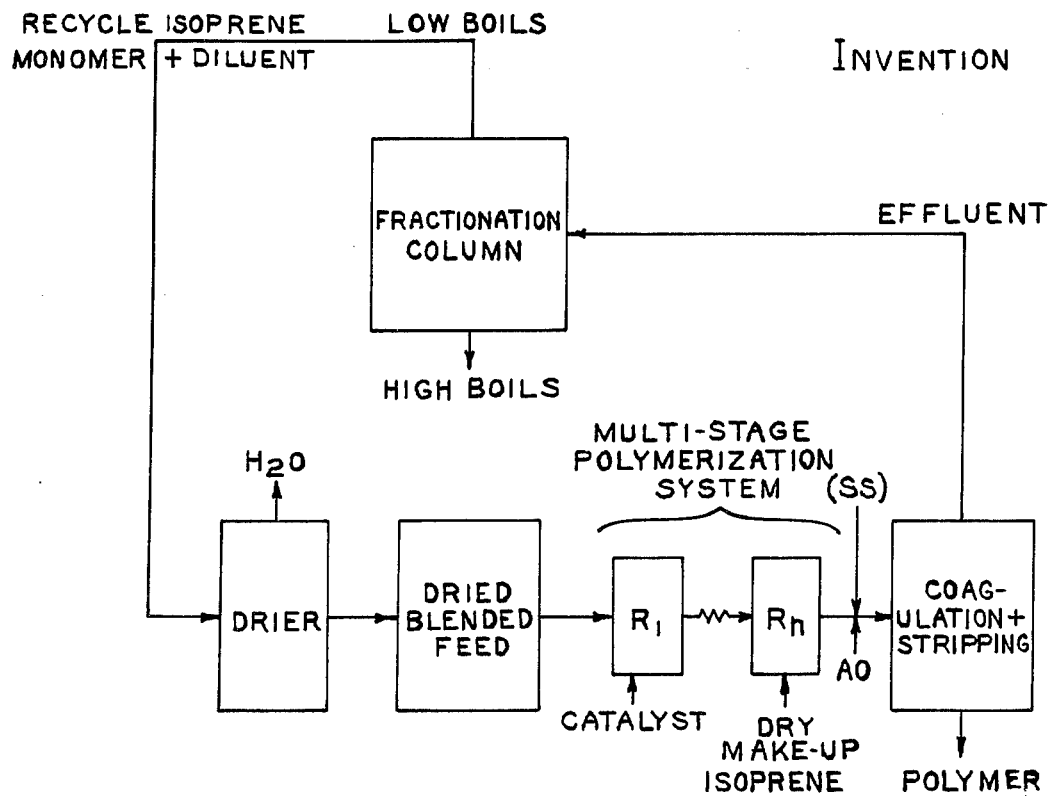
Fig.2 — Invention

PROCESS FOR PREPARATION OF CIS-1,4 POLY)ISOPRENE)

BACKGROUND OF THE INVENTION

1. Field of the Invention

This invention relates to a process. More specifically, this invention involves an improved process for the synthesis of cis-1,4 poly(isoprene).

2. Description of the Prior Art

The synthesis of cis-1,4 poly(isoprene) and the problems related to its preparation have been extensively documented in the open technical literature. The preferred technique for the preparation of this polymer is the initiation of polymerization of its corresponding monomer with a Ziegler/Natta coordination type catalyst mixture. This type of catalyst is responsible for the stereoregularity and high yield of the resultant polymer. Where the isoprene monomer used in preparation of the stereoregular polymer is obtained from hydrocarbon conversion processes (e.g. the cracking or dehydrohalogenation of hydrocarbons) extensive purification of the monomer is generally required to remove polymerization catalyst deactivating agents (e.g. α-acetylenes and cyclopentadienes). The failure to remove such impurities can substantially increase the amount of catalyst required to effectively polymerize the isoprene monomer. The removal of cyclopentadiene impurities from crude isoprene monomer can reportedly be achieved by treating the crude isoprene with maleic anhydride, see U.S. Pat. No. 2,935,540. Alpha-acetylene contamination of isoprene can also cause deactivation of polymerization catalyst, however, to a lesser extent than cyclopentadiene. Alpha-acetylene purification of the crude isoprene monomers can reportedly be achieved through the use of molecular sieves, see U.S. Pat. No. 2,900,430. Another technique for removal of α-acetylene contaminants from crude isoprene monomers involves contacting the crude isoprene monomer with metallic sodium in a hydrocarbon diluent under the appropriate conditions, followed by separation of the isoprene from the dispersed particulates (unreacted sodium and sodium reaction products) with a molecular sieve, see U.S. Pat. Nos. 2,935,540; and 3,285,989. It has also been suggested that α-acetylene impurity levels can be effectively reduced by pre-reacting the impure isoprene monomer with one or more of the components of the polymerization catalyst, U.S. Pat. No. 3,442,878 (Col. 1, lines 29-35). This technique has, however, proven unsatisfactory because the catalyst residue remaining in the monomer subsequent to such treatment is disruptive of polymerization of the treated monomer, U.S. Pat. No. 3,442,878 (Col. 1, lines 35-50).

The preparation of crude isoprene monomer from hydrocarbon conversion processes can also result in saturation of the resultant monomer product with water. U.S. Pat. No. 2,905,659 discloses that the presence of water in the monomer charge can result in deactivation of the polymerization catalyst (Col. 1, lines 51 through 55); and, in practice water is routinely extracted from the monomer prior to its introduction into the polymerization medium.

In continuous processes for the polymerization of crude isoprene to cis-1,4 poly(isoprene), only a portion of the isoprene monomer is ordinarily converted to polymer, the unconverted portion then being recycled back into the polymerization stream. It is often desirable, and under certain conditions essential, to maintain the concentration of monomer in the polymerization medium within certain predetermined limits. Thus, the polymerization is carefully monitored and new monomer continuously added to the process to replace that which has been converted to polymer. The replacement portion of the monomer (hereinafter referred to as "make-up" isoprene monomer) has traditionally been introduced into the process stream at a point remote from the polymer product, cis-1,4 poly(isoprene). The "make-up" isoprene monomer and the isoprene monomer with associated solvents (which is recycled back into the system from the polymerization reactors) are generally combined, dehydrated (e.g. as by distillation) and metered into a downstream reactor where they are combined with an appropriate amount of polymerization catalyst. The presence of contaminants in the "make-up" isoprene can, as indicated previously, result in deactivation of the polymerization catalyst and thus it is necessary to either (a) add additional amounts of catalyst to compensate for such anticipated deactivation or (b) subject the "make-up" isoprene to a further purification whereby the relative concentration of contaminants therein is reduced to acceptable levels. As is thus apparent, the manufacture of cis-1,4 poly(isoprene) rubber by continuous polymerization processes is inefficient, regarding its consumption of catalyst, since it is economically impractical to subject the "make-up" isoprene monomer to extensive purification prior to introduction into the polymerization stream.

SUMMARY OF THE INVENTION

Accordingly, it is the object of this invention to remedy the above as well as related deficiencies in such prior art processes.

More specifically, it is the principal object of this invention to provide an improved continuous process for the stereoregular polymerization of isoprene monomer to cis-1,4 poly(isoprene).

Another object of this invention is to provide an improved continuous process for the stereoregular polymerization of isoprene monomer containing previously unacceptable levels of contaminants, such as α-acetylenes and cyclopentadiene.

Yet another object of this invention is to provide an improved continuous process for the stereoregular polymerization of isoprene monomer at substantially increased yields relative to catalyst consumption.

Still yet another object of this invention is to provide an improved continuous process for the stereoregular polymerization of isoprene monomer using a coordination catalyst.

Additional objects of this invention include providing a method for prevention of deactivation of polymerization catalysts used in the stereoregular polymerization of isoprene to cis-1,4 poly(isoprene).

The above and related objects are achieved by providing an improved continuous process for the stereoregular polymerization of crude isoprene monomer to cis-1,4 poly(isoprene) with a coordination or alkyl lithium catalyst. In this process, "make-up" isoprene monomer is pre-dried and added to the polymerization process stream subsequent to initiation of polymerization of the isoprene monomer feed but prior to deactivation of the polymerization catalyst. In one of the preferred embodiments of this invention, the "make-up" isoprene monomer contains contaminants at a level previously found to be unacceptable for such commercial processes.

BRIEF DESCRIPTION OF THE DRAWINGS

FIG. 1 is a schematic flow chart of a typical prior art process for the continuous stereoregular polymerization of isoprene monomer to cis-1,4 poly(isoprene).

FIG. 2 is a schematic flow chart of the improved continuous process for the stereoregular polymerization of isoprene monomer to cis-1,4 poly(isoprene).

DESCRIPTION OF THE INVENTION INCLUDING PREFERRED EMBODIMENTS

Figure 3:
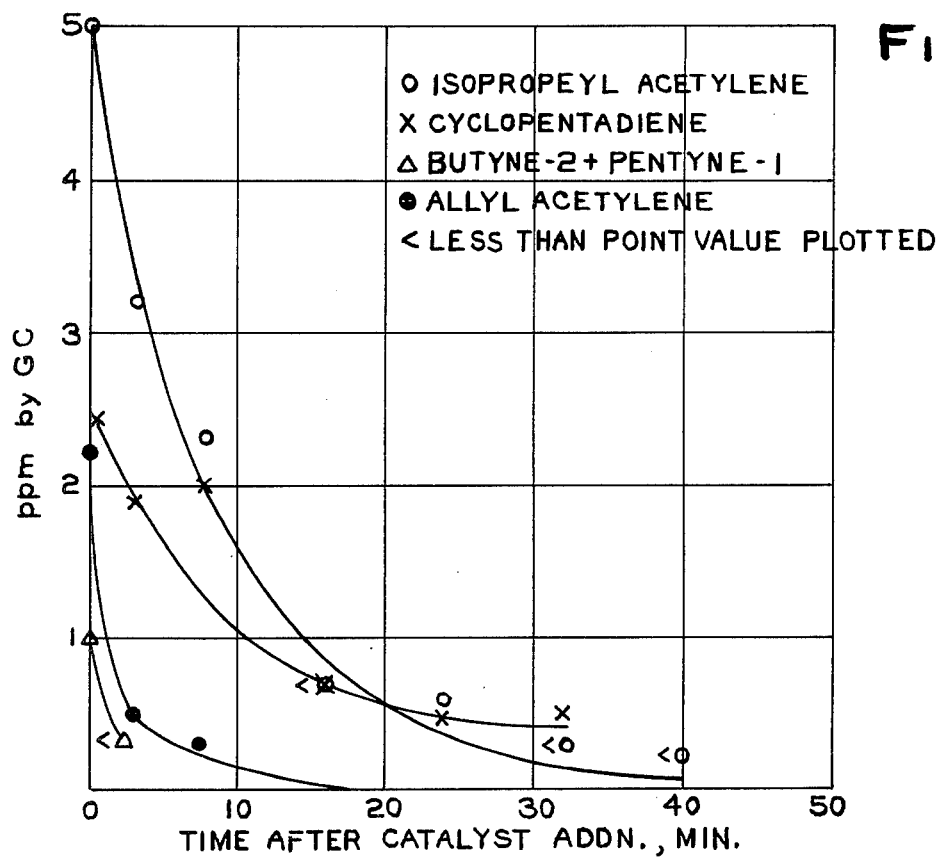
FIG. 3 is a graphical illustration of the reduction in impurity level in the polymerization medium containing isoprene monomer, as a function of time, after catalyst addition.

FIG. 1 is illustrative of a prior art process for the stereoregular polymerization of isoprene to cis-1,4 poly(isoprene). As shown in FIG. 1, a source of isoprene monomer, identified as the blended feed, is initially dehydrated by passing the blended feed into a distillation type dryer. Upon removal of water from this feedstock, the dried material is collected in a separate vessel and distributed therefrom into the first stage of a series of polymerization reactors, designated as $R_1$ in FIG. 1. The reactor also contains a monomer diluent and a polymerization catalyst (a Ziegler-Natta type coordination catalyst). Polymerization of the monomer will commence, after a brief induction period, and means are ordinarily provided to control the exotherm of the polymerization reaction so as to prevent the temperature of the reactants from exceeding a predetermined level. Control of the temperature within the reactor is critical with respect to the molecular weight of the polymer. Ordinarily, the polymerization reaction is not allowed to proceed to the desired level of completion within the first reactor but rather the contents of the first reactor are channelled into one or more downstream reactors where the reaction proceeds to the desired degree of completion. As a general practice, the polymerization of the monomer is not allowed to go to completion but rather is "short-stopped" well in advance of that point. The "short-stop" agent is added after the last reactor of the series in sufficient quantity to deactivate the catalyst thereby effectively terminating the continued polymerization of the monomer. After deactivation of the polymerization catalyst, rubber stabilizers can be added to the polymer. The stabilized polymer solution is collected, the polymer contained therein coagulated and the fluid fraction thereof stripped from the coagulated material. The "short-stop" agents suitable for use in this process can be virtually any catalyst poison which is otherwise compatible with the polymer product and/or recycle stream. The following classes of materials can be effectively used in the improved process of this invention as "short-stop" agents: alcohols, aldehydes, organic acids and water. Such agents, and their reaction product with catalyst, will usually either be entrapped within the polymer upon coagulation thereof or remain in solution. In the latter case, such agents must of course be removed from the recycle stream prior to contact of this stream with fresh catalyst.

As is apparent, a portion of the original monomer has been consumed by conversion to the desired polymeric product. As is generally the practice in commercially oriented polymerization processes, the monomer content in the primary reactor vessel is kept at a fairly constant level. Thus, additional isoprene monomer must be introduced into the process stream. This replacement or "make-up" isoprene monomer has traditionally been blended with the recycled monomer and diluent and the blended feed processed as previously described.

As illustrated in FIG. 2, the process of this invention departs significantly from the prior art in that "make-up" isoprene is introduced into the process stream after initiation of polymerization of the monomer in the primary reactor vessel but prior in time to the addition of the "short-stop" agent to the polymerization medium. In one of the preferred embodiments of this invention, the "make-up" isoprene monomer is added to the last polymerization reactor in the process stream. As noted in FIG. 2, because of the downstream addition of the "make-up" isoprene to the process stream, the "make-up" isoprene must be dehydrated. Dehydration of the "make-up" isoprene involves the removal of substantially all water from the monomer. This can be achieved by passing the "wet" monomer through a series of sieve driers or other equivalent devices. The process of this invention also significantly differs from the prior art process in that the level of contaminants present in the "make-up" isoprene can be substantially greater than could be tolerated in a "make-up" isoprene for an equivalent prior art process (of the type shown in FIG. 1).

The isoprene monomer used as the feedstock for the process of this invention can be produced by at least two well known processes: (a) a propylene dimer process and (b) by dehydrogenation of 2-methyl-butenes and/or isopentane.

The propylene dimer process consists of three basic steps. The first step involves the dimerization of propylene to 2-methyl-1-pentene. The product of such dimerization is converted to 2-methyl-2-pentene by standard isomerization techniques. Lastly, the 2-methyl-2-pentene is subjected to heating under pyrolytic conditions wherein both isoprene and methane are produced.

Preparation of isoprene monomer by dehydrogenation is similar to the process for the production of butadiene. A refinery fraction containing isopentane and/or 2-methyl butenes is dehydrogenated in a Houdry process reactor. The $C_5$ fraction is recovered from the reaction product and isoprene separated therefrom by extractive distillation. Both of the above processes for the synthesis of isoprene monomer are preferred for the preparation of commercially acceptable grades of this monomer because of the relative economic advantages inherent in each. The isoprene monomer prepared from either of these processes is, however, contaminated with α-acetylenes and cyclopentadiene. As indicated previously, the prior art recognizes that these impurities can substantially impair the catalytic activity of the coordination catalysts used in the stereoregular polymerization of isoprene to cis-1,4 poly(isoprene).

The polymerization catalysts used in the commercial production of poly(isoprenes) are either of the coordination (Ziegler-Natta) or alkyl lithium types. The coordination catalysts suitable for use in the process of this invention will ordinarily comprise trialkyl aluminum-titanium tetrachloride mixtures wherein the aluminum/- titanium mole ratio is about 1:1. The aluminum/titanium mole ratio is critical for the achievement of high cis-1,4 poly(isoprene) content and the achievement of high polymer yields. Under certain conditions it may be desirable to complex the trialkyl aluminum component of the catalyst mixture with an ether thereby yielding a more catalytically active material. The coordination catalysts used in the process of this invention for the preparation of cis-1,4 poly(isoprene) are generally insoluble in the polymerization medium and therefore are present in the form of a finely dispersed suspension. The preferred coordination catalyst which is suitable for use in this process is prepared according to the technique described in Canadian Pat. No. 922,849 (which is hereby incorporated by reference in its entirety).

The alkyl lithium compounds used as polymerization catalysts for isoprene are highly desirable because they enable close control over the molecular weight distribution of the resultant polymer. In addition, the polymeric product prepared in the presence of an alkyl lithium catalyst is substantially devoid of any gel, and the presence of such alkyl lithium residues in the resultant polymer does not have any substantial deleterious effect upon the aging properties of the elastomer. Empirical testing has shown that the type of alkyl group on the lithium atom has little if any effect on the cis amount of polymerization of the polymer.

The preferred alkyl lithium catalyst suitable for use in the type of process of this invention is butyl lithium. Unlike the coordination catalysts referred to hereinabove, the alkyl lithium systems are soluble in the polymerization medium and are characterized by the complete absence of a termination reaction (e.g. polymerization continuing as long as monomer is present).

In the improved process of this invention, the addition of dry "make-up" isoprene to the actively polymerizing polymer apparently results in the removal of substantially all α-acetylene impurities from the "make-up" isoprene and approximately half the cyclopentadiene from the "make-up" isoprene. The extent of scavenging of impurities from "make-up" isoprene by the actively polymerizing polymer is time dependent: that is, the longer the residence time of the "make-up" isoprene monomer in the actively polymerizing medium the greater the reduction in impurities in the isoprene which is recycled back into the process stream. Since the cyclopentadiene impurity poses the more serious problem regarding catalyst deactivation, the preferred interval between addition of the "make-up" isoprene and "shortstop" of the polymerization is calculated based upon a predetermined tolerance level for this impurity (generally less than 5 ppm based upon isoprene concentration). As is apparent, essentially total removal of contaminants from the isoprene monomer would be possible if one were also willing to permit more extensive depletion of monomer from the final polymerization reactor stage. However, for efficient operation of the continuous polymerization process, it is desirable to prevent depletion of the polymerization medium of monomer and therefore, the amount of monomer consumed through the final stage of polymerization is generally less than half that of the initial charge.

A series of experiments were devised in order to evaluate the improved process of this invention. These tests involved the addition of dry "make-up" isoprene to an actively polymerizing isoprene monomer solution and thereafter monitoring the contaminants remaining in the system over a period of time. In certain instances, the "make-up" isoprene was spiked with relatively large concentrations of α-acetylenes and cyclopentadiene. As will be apparent from the Examples which follow, the level of impurities contained in the "make-up" isoprene was significantly reduced upon addition of this material to the solution containing the actively polymerizing monomer. Thus, the recycle stream containing the "make-up" isoprene required approximately one third less polymerization catalyst to achieve equivalent polymer yields.

EXAMPLES

The Examples which follow further define, describe and illustrate the improved process of this invention. Apparatus and techniques used in such Examples are standard or as hereinabove described. Parts and percentages appearing in such Examples are by weight unless otherwise stipulated.

EXAMPLE I

A series of seven bottle polymerizations were set up in a rotating constant temperature bottle bath in order to demonstrate the ability of the actively polymerizing monomer charge to remove contaminants from dry "make-up" isoprene added thereto. The initial monomer charge comprised 51 grams isoprene monomer (commercial grade), 0.31 parts titanium tetrachloride per 100 parts monomer and 314 grams hexane. The initial level of cyclopentadiene contaminant in the isoprene was 25 ppm (2.3 mole percent based upon titanium concentration). The level of α-acetylenes was about 70 ppm. The temperature of the bath was approximately 30° C. In control samples A, B and C, polymer content of the polymerization medium was monitored at 40 minutes, 50 minutes, and 60 minutes after initial mixing of the ingredients (see FIG. 4). Essentially no conversion of monomer to polymer was observed until about 32 minutes after the materials were combined under polymerization conditions. Approximately 42% of the monomer was converted to polymer after 40 minutes into the polymerization; approximately 68% of the monomer converted to polymer after 50 minutes into the polymerization; and approximately 78% of the monomer converted to polymer after about 60 minutes into the polymerization. After 45 minutes into the polymerization, approximately 51 grams of dry "make-up" isoprene (commercial grade) was added to each of the four additional bottle polymerizations D, E, F and G used in this evaluation, followed by deactivation of the polymerization catalysts after 10 minutes (Bottle D), 20 minutes (Bottle E), 30 minutes (Bottle F), and 40 minutes (Bottle G) additional contact time.

Figure 5:
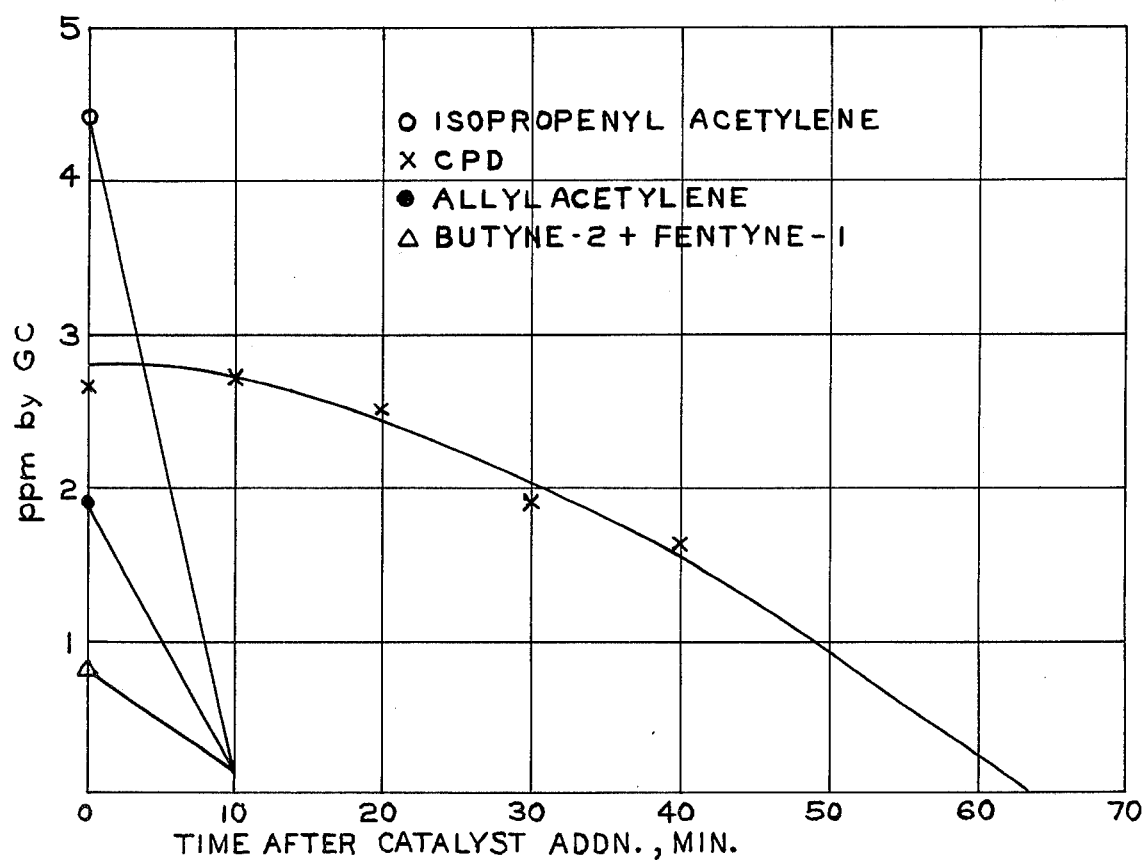
FIG. 5 is a graphical illustration of the reduction of the impurity level in the polymerization medium following the addition of dry "make-up" isoprene to the actively polymerizing charge.
Figure 4:
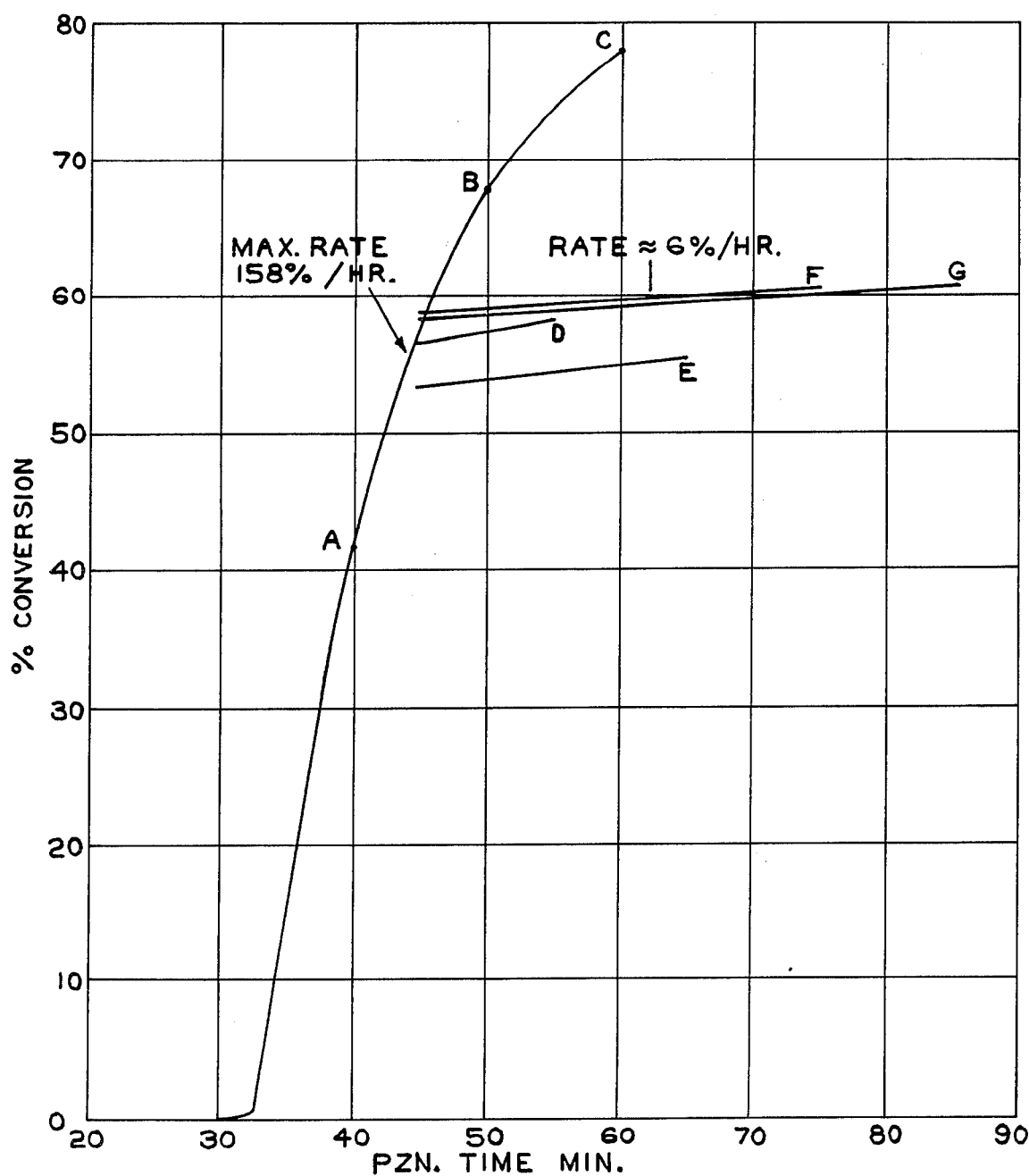
FIG. 4 is a graphical illustration which demonstrates the decrease in polymerization rate of isoprene following the addition of dry "make-up" isoprene to the charge.

As illustrated in the graphical data provided in FIG. 3, the impurity level of the initial charge is dramatically reduced upon introduction of the polymerization catalyst. The impurity level illustrated in FIG. 3 was obtained by periodic sampling of the polymerization medium at various intervals and subjecting these samples to analysis by gas chromatography. FIG. 4 graphically illustrates the retardation in the rate of polymerization upon the addition of dry "make-up" isoprene to actively polymerizing monomer charges D–G. As is apparent from FIG. 4, the impurities within the "make-up" isoprene effectively retard the polymerization rate by deactivation of the polymerization catalyst. FIG. 5 graphically illustrates the reduction in the overall level of impurities after the addition of the dry "make-up" isoprene to the actively polymerizing monomer charges.

The level of impurity of α-acetylenes is effectively reduced to zero (0) within about 10 minutes following such addition. The impurity level of cyclopentadiene is reduced at a more gradual rate. When the unpolymerized monomer is separated from the polymeric product of the synthesis and the monomers recycled through essentially the same polymerization process, substantially less catalyst is needed to effectively polymerize the monomer. In order to measure the degree of improvement, a parallel experiment was run in which a five gallon batch charge was made using isoprene containing 70 ppm acetylenes and four ppm CPD. This polymerization was run in the normal way to 14% total solids (elapsed time 178 minutes). At 178 minutes, dry "make-up" isoprene, equivalent in amount to the isoprene converted to polymer, was added to the still actively polymerizing charge. The added isoprene contained 210 ppm acetylenes and four ppm CPD. After 35 minutes additional contact time, the reaction was terminated and the volatile hydrocarbons recovered by steam stripping. After drying, this recovered feed — now containing "make-up" isoprene — was compared in bottle polymerizations, to the original 5-gallon charge materials. Some pure solvent was added to the original material to the original material to make both charges exactly equivalent in isoprene concentrations. The recycled feed required 35% less catalyst to reach 14% total solids in two hours.

The foregoing Examples have been provided to illustrate the improved process of this invention and are not intended to delineate its scope which is set forth in the following claims.

I claim:

1. In a continuous process for the stereoregular polymerization of isoprene monomer, containing α-acetylenes and cyclopentadiene impurities, wherein the isoprene monomer is (a) initially subjected to dehydration, (b) charged to the first in a series of reactors containing a solvent for said monomer and a catalyst directive for the stereoregular polymerization of said monomer to cis-1,4 poly(isoprene), (c) the contents of (b) transferred from the first reactor to a downstream reactor where the isoprene is polymerized further, (d) the polymerization terminated prior to conversion of all of said monomer to cis-1,4 poly(isoprene) by contacting the catalyst with a "short-stop" agent, (e) separating the unpolymerized monomer from the cis-1,4 poly(isoprene), (f) replacement of the monomer converted to polymer by the addition of "make-up" isoprene, containing α-acetylene and cyclopentadiene impurities, to the isoprene monomer recovered in step (e), and (g) repeating steps (a) to (f) in sequence at least one additional time, the improvement comprising:

adding pre-dried "make-up" isoprene, containing α-acetylenes and cyclopentadiene impurities, to a charge containing actively polymerizing isoprene monomer, cis-1,4 poly(isoprene) and catalyst which is directive for the stereoregular polymerization of said monomer to cis-1,4 poly(isoprene), said "make-up" isoprene being added to the last of the series of reactors and in sufficient quantities to replace substantially all of the isoprene monomer contemplated for conversion to polymer; and deactivating the polymerization catalyst subsequent to the addition of the "make-up" isoprene to the charge by contacting said catalyst with a "short-stop" agent, the interval between addition of the "make-up" isoprene to the actively polymerizing monomer and subsequent deactivation of the catalyst being sufficient to allow for the scavenging of substantially all of the α-acetylenes and at least 50% of the cyclopentadiene impurities from the "make-up" isoprene by said catalyst.

2. The improved process of claim 1, wherein the amount of "make-up" isoprene added to the charge represents less than 50% by weight of the total isoprene monomer content of the initial charge.

3. The improved process of claim 1, wherein the catalyst is of the coordination type.

4. The improved process of claim 1, wherein the catalyst comprises a reduced form of titanium tetrachloride.

5. The improved process of claim 1, wherein the catalyst comprises an alkyl lithium compound.

6. The improved process of claim 1, wherein the level of impurity in the isoprene monomer is in excess of that normally found in polymerization grade isoprene monomer.

7. The improved process of claim 1, wherein the amount of "make-up" isoprene added to the charge represents less than 75% by weight of the total isoprene monomer content of the initial charge.

* * * * *